US012792914B2

(12) United States Patent
Gao et al.

(10) Patent No.: US 12,792,914 B2
(45) Date of Patent: *Nov. 10, 2026

(54) AGENT TRAJECTORY PREDICTION USING VECTORIZED INPUTS

(71) Applicant: Waymo LLC, Mountain View, CA (US)

(72) Inventors: Jiyang Gao, Foster City, CA (US); Yi Shen, Los Altos Hills, CA (US); Hang Zhao, Sunnyvale, CA (US); Chen Sun, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 18/987,451

(22) Filed: Dec. 19, 2024

(65) Prior Publication Data

US 2025/0200366 A1 Jun. 19, 2025

Related U.S. Application Data

(63) Continuation of application No. 17/099,656, filed on Nov. 16, 2020, now Pat. No. 12,217,168.

(Continued)

(51) Int. Cl.

*G06N 3/00* (2023.01)
*G01C 21/00* (2006.01)

(Continued)

(52) U.S. Cl.

CPC ........... *G06N 3/08* (2013.01); *G01C 21/3848* (2020.08); *G05D 1/0088* (2013.01); *G05D 1/227* (2024.01)

(58) Field of Classification Search

CPC .......... G06N 3/08; G06N 3/044; G06N 3/045; G06N 3/0455; G06N 3/048; G06N 3/09; G06N 3/084; G01C 21/3848; G05D 1/0088; G05D 1/227; G06T 2207/20081; G06T 2207/20084; G06T 2207/30232; G06T 2207/30236; G06T 2207/30241; G06T 7/246; H04W 4/44; G08G 1/0141; G08G 1/166; G08G 1/0112; G08G 1/0133;

(Continued)

(56) References Cited

U.S. PATENT DOCUMENTS

2017/0016730 A1* 1/2017 Gawrilow .............. G01C 21/30
2017/0016734 A1* 1/2017 Gupta ................... B60W 30/00

(Continued)

FOREIGN PATENT DOCUMENTS

CN 108629978 A 10/2018
CN 110135314 A 8/2019

(Continued)

OTHER PUBLICATIONS

Office Action in Chinese Appln. No. 202080079400.X, mailed on Jan. 27, 2025, 16 pages (with English translation).

(Continued)

*Primary Examiner* — Peter D Nolan
*Assistant Examiner* — Peter Y Ning
(74) *Attorney, Agent, or Firm* — Fish & Richardson P.C.

(57) ABSTRACT

Methods, systems, and apparatus, including computer programs encoded on computer storage media, for agent trajectory prediction using vectorized inputs.

18 Claims, 4 Drawing Sheets

Related U.S. Application Data

(60) Provisional application No. 62/936,320, filed on Nov. 15, 2019.

(51) Int. Cl.

| | |
|---|---|
| ***G06N 3/08*** | (2023.01) |
| *G05D 1/00* | (2006.01) |
| *G05D 1/227* | (2024.01) |

(58) Field of Classification Search
CPC ..... G08G 1/04; B60W 60/0027; G06V 10/82; G06V 20/56
See application file for complete search history.

(56) References Cited

U.S. PATENT DOCUMENTS

| | | | | |
|---|---|---|---|---|
| 2018/0252536 | A1* | 9/2018 | Dorum | G01C 21/3673 |
| 2019/0072966 | A1 | 3/2019 | Zhang et al. | |
| 2019/0095722 | A1* | 3/2019 | Kang | G06V 20/588 |
| 2019/0147255 | A1* | 5/2019 | Homayounfar | G01C 21/3602 701/23 |
| 2019/0147320 | A1* | 5/2019 | Mattyus | G06F 18/2155 382/155 |
| 2019/0204096 | A1* | 7/2019 | Cai | G01C 21/3446 |
| 2019/0220696 | A1* | 7/2019 | Kraft | G06V 10/82 |
| 2019/0258251 | A1* | 8/2019 | Ditty | B60W 60/0015 |
| 2021/0001897 | A1* | 1/2021 | Chai | B60W 60/00274 |
| 2022/0048498 | A1* | 2/2022 | Khandelwal | B60W 30/09 |
| 2022/0180643 | A1* | 6/2022 | Retterath | B60W 40/06 |
| 2023/0150550 | A1* | 5/2023 | Shi | B60W 60/00274 701/23 |

FOREIGN PATENT DOCUMENTS

| | | | | |
|---|---|---|---|---|
| CN | 110389581 A | | 10/2019 | |
| KR | 101951595 | | 2/2019 | |
| WO | WO 2019/027469 | | 2/2019 | |
| WO | WO-2019027469 A1 | * | 2/2019 | G01C 21/3614 |
| WO | WO 2022/205642 | | 10/2022 | |
| WO | WO-2022205642 A1 | * | 10/2022 | G06Q 50/26 |

OTHER PUBLICATIONS

Notice of Allowance in Chinese Appln. No. 202080079400.X, mailed on Sep. 30, 2025, 8 pages (with machine translation).
Alahi et al., "Social LSTM: Human Trajectory Prediction in Crowded Spaces," Proceedings of the IEEE Conference on Computer Vision and Pattern Recognition, pp. 961-971.
Battaglia et al., "Relational inductive biases, deep learning, and graph networks," CoRR, Jun. 2018, arXiv:1806.01261, 40 pages.
Casas et al., "Intentnet: Learning to predict intention from raw sensor data," Proceedings of the 2nd Conference on Robot Learning, 2018, pp. 87:947-956.
Chai et al., "MultiPath: Multiple Probabilistic Anchor Trajectory Hypotheses for Behavior Prediction," CoRR, Oct. 2019, arxiv.org/abs/1910.05449, 14 pages.
Chang et al., "Argoverse: 3D tracking and forecasting with rich maps," Proceedings of the IEEE Conference on Computer Vision and Pattern Recognition, 2019, pp. 8748-8757.
Chung et al., "A recurrent latent variable model for sequential data," CoRR, Jun. 2015, arxiv.org/abs/1506.02216, 9 pages.
Devlin et al., "BERT: Pre-training of deep bidirectional transformers for language understanding," CoRR, Oct. 2018, arXiv:1810.04805, 16 pages.
Extended Search Report in European Appln. No. 20888315.7, dated Oct. 2, 2023, 6 pages.
Felsen et al., "What will happen next? forecasting player moves in sports videos," Proceedings of the IEEE International Conference on Computer Vision, 2017, pp. 3342-3351.
Gupta et al., "Social GAN: Socially acceptable trajectories with generative adversarial networks," Proceedings of the IEEE Conference on Computer Vision and Pattern Recognition, 2018, pp. 2255-2264.
He et al., "Deep residual learning for image recognition," Proceedings of the IEEE Conference on Computer Vision and Pattern Recognition, 2016, pp. 770-778.
Hong et al., "Rules of the road: Predicting driving behavior with a convolutional model of semantic interactions," Proceedings of the IEEE Conference on Computer Vision and Pattern Recognition, 2019, pp. 8454-8462.
Hoshen, "VAIN: Attentional multi-agent predictive modeling," CoRR, Jun. 2017, arXiv:1706.06122, 12 pages.
International Preliminary Report on Patentability in International Appln. No. PCT/US2020/060749, dated May 27, 2022, 7 pages.
Kingma et al., "Adam: A method for stochastic optimization," CoRR, Dec. 2014, arXiv:1412.6980, 15 pages.
Kipf et al., "Neural relational inference for interacting systems," Proceedings of the 35th International Conference on Machine Learning, 2018, 80:2688-2697.
Lei Ba et al., "Layer normalization," CoRR, Jul. 2016, arXiv:1607.06450, 14 pages.
Office Action in Israeli Appln. No. 292876, dated Aug. 14, 2024, 3 pages.
PCT International Search Report and Written Opinion in International Appln. No. PCT/US2020/060749, dated Mar. 5, 2021, 10 pages.
Qi et al., "Pointnet: Deep learning on point sets for 3D classification and segmentation," Proceedings of the IEEE Conference on Computer Vision and Pattern Recognition, 2017, pp. 652-660.
Qi et al., "Pointnet++: Deep hierarchical feature learning on point sets in a metric space," CoRR, Jun. 2017, arxiv.org/abs/1706.02413, 14 pages.
Radford et al., "Language models are unsupervised multitask learners," OpenAI blog, Feb. 2019, 1(8):9.
Rhinehart et al., "Precog: Prediction conditioned on goals in visual multi-agent settings," Proceedings of the IEEE/CVF International Conference on Computer Vision, 2019, pp. 2821-2830.
Robicquet et al., "Learning social etiquette: Human trajectory understanding in crowded scenes," European Conference on Computer Vision, 2016, pp. 549-565.
Su et al., "Vl-bert: Pre-training of generic visuallinguistic representations," CoRR, Aug. 2019, arXiv:1908.08530, 16 pages.
Sun et al., "Stochastic prediction of multi-agent interactions from partial observations," CoRR, Feb. 2019, arxiv.org/abs/1902.09641, 15 pages.
Sun et al., "VideoBERT: A joint model for video and language representation learning," Proceedings of the IEEE/CVF International Conference on Computer Vision, 2019, pp. 7464-7473.
Vaswani et al., "Attention is all you need," CoRR, Jun. 2017, arxiv.org/abs/1706.03762, 15 pages.
Velickovic et al., "Graph attention networks," CoRR, Oct. 2017, arxiv.org/abs/1710.10903, 12 pages.
Zhan et al., "Generative multi-agent behavioral cloning," CoRR, Mar. 2018, arXiv:1803.07612, 14 pages.

* cited by examiner

AGENT TRAJECTORY PREDICTION USING VECTORIZED INPUTS

CROSS-REFERENCE TO RELATED APPLICATION

This patent application is a continuation (and claims the benefit of priority under 35 USC 120) of U.S. patent application Ser. No. 17/099,656, filed Nov. 16, 2020, which claims the benefit of U.S. Provisional Application No. 62/936,320, filed on Nov. 15, 2019. The disclosures of the prior applications are considered part of and are incorporated by reference in the disclosure of this application.

BACKGROUND

This specification relates to predicting the future trajectory of an agent in an environment.

The environment may be a real-world environment, and the agent may be, e.g., a vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various prediction tasks, e.g., object classification within images. For example, a neural network can be used to determine that an image captured by an on-board camera is likely to be an image of a nearby car. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values, e.g., using gradient descent. Once a neural network is trained, the final set of parameter values can be used to make predictions in a production system.

SUMMARY

This specification generally describes a system implemented as computer programs on one or more computers in one or more locations that predicts the future trajectory of an agent in an environment using vectorized inputs.

The subject matter described in this specification can be implemented in particular embodiments so as to realize one or more of the following advantages.

The system described in this specification can generate a trajectory prediction output for one or more agents in an environment using a vectorized representation of the scene in the environment. In particular, the representation employed by the described system approximates geographic entities and the dynamics of moving agents using polylines that are represented as sequences of vectors. By making use of these representations, the system avoids the lossy rendering and computationally intensive encoding steps that are required by existing systems that represent the scene in the environment as a rendered image. Additionally, using these representations as input allows the described systems to generate trajectory predictions both by exploiting the spatial locality of individual road components represented by vectors and additionally modeling the high-order interactions among all components. In particular, because of the use of the vectorized representations, the described system can achieve on par or better performance than conventional systems, e.g., those that use the rendering approach, on many behavior predictions tasks while saving a significant amount, e.g., over 70%, of the model parameters with an order of magnitude reduction in FLOPs. That is, a model that uses the described representations can have significantly fewer parameters (and therefore, a significantly smaller memory footprint) and require an order of magnitude fewer FLOPs than a conventional system that operates on different types of representations while still achieving on par or better performance.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a trained machine learning model, referred to in this specification as a "trajectory prediction system," to generate a respective trajectory prediction for each of one or more surrounding agents in the vicinity of the vehicle in an environment.

In this specification, a "surrounding agent" can refer, without loss of generality, to a vehicle, bicycle, pedestrian, ship, drone, or any other moving object in an environment.

This specification also describes how training examples generated by vehicles can be used to effectively train the trajectory prediction system to accurately and reliably make predictions.

While this specification describes that trajectory prediction outputs are generated on-board an autonomous vehicle, more generally, the described techniques can be implemented on any system of one or more computers that receives data characterizing scenes in an environment.

Moreover, while this specification describes that vectorized representations are used as input to a trajectory prediction neural network, more generally, polylines features for a given polyline generated by the described system can be used as input to a machine learning model that generates any appropriate prediction for the road element or agent represented by the polyline.

Figure 1:
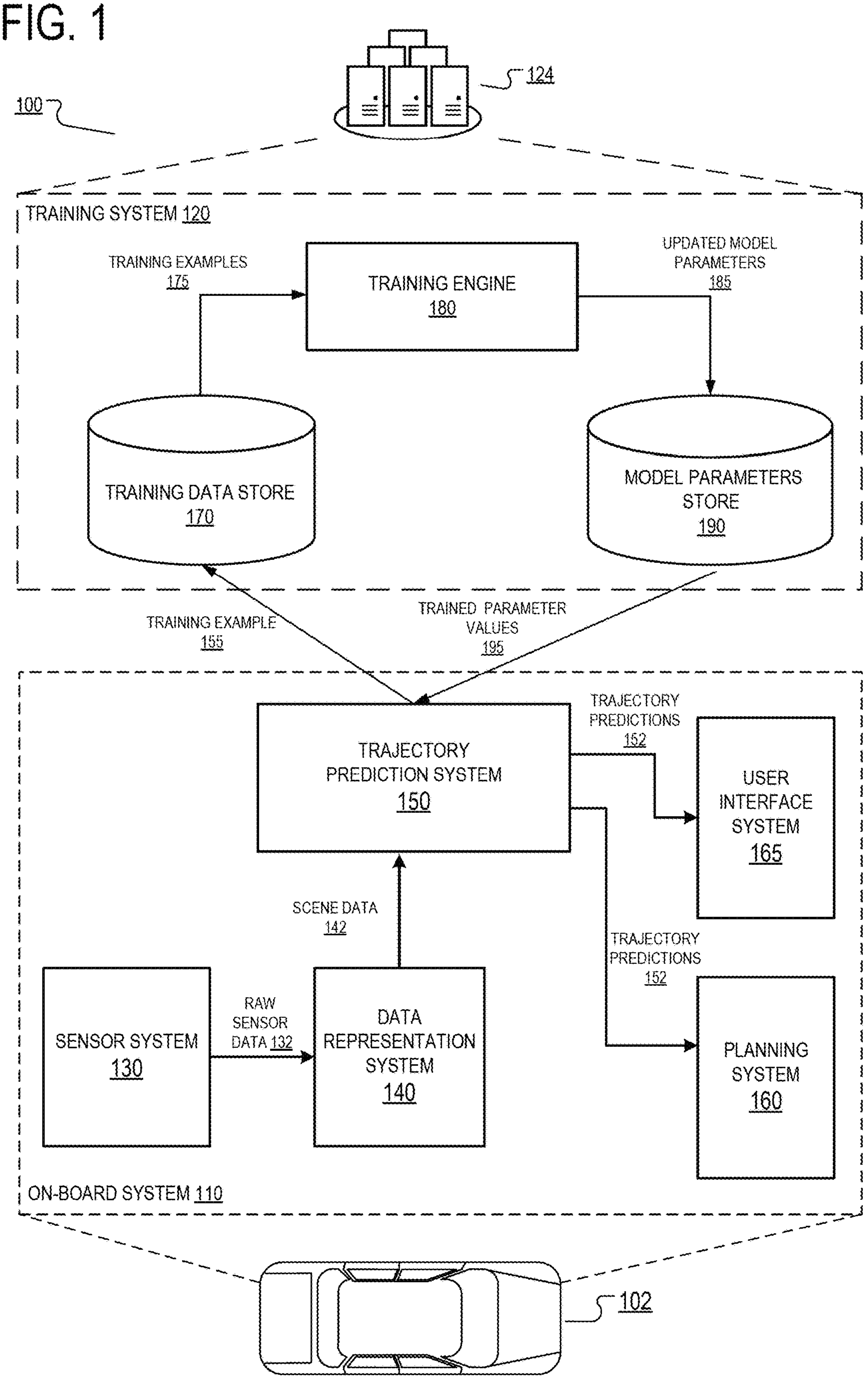
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and other data characterizing the environment, e.g., map data that identifies map features in the vicinity of the vehicle, and generates scene data 142. The scene data 142 characterizes the current state of the environment surrounding the vehicle 102 as of the current time point.

In particular, the scene data 142 includes at least (i) data characterizing observed trajectories for each of one or more agents in an environment, i.e., observed trajectories for one or more of the surrounding agents, and (ii) data characterizing map features of a map of the environment. The data characterizing the observed trajectories can include data specifying the location of the corresponding surrounding agent at the current time step and one or more time steps that precede the time step. The data can optionally also include other information, e.g., the heading of the agent, the velocity of the agent, the type of the agent, and so on. Map features can include lane boundaries, crosswalks, stoplights, road signs, and so on.

The data representation system 140 provides the scene data 142 to a trajectory prediction system 150, also on-board the vehicle 102.

The trajectory prediction system 150 processes the scene data 142 to generate a respective trajectory prediction output 152, i.e., a predicted trajectory, for each of one or more of the surrounding agents. The trajectory prediction output 152, i.e., the predicted trajectory, for a given agent characterizes the predicted future trajectory of the agent after the current time point.

The predicted trajectory generated by the system 150 can be represented in the output 152 of the system 150 any of a variety of ways.

In some implementations, the trajectory prediction system 150 directly regresses a respective future trajectory for the each of the one or more surrounding agents and the trajectory prediction output 152 for a given agent includes regressed trajectory states, i.e., locations and optionally other information such as headings, at each of multiple future time points.

In some other implementations, the trajectory prediction output 152 for a given agent defines a respective probability distribution over possible future trajectories for the given agent. As a particular example, the trajectory prediction output 152 for a given agent can include data characterizing a predicted similarity of the future trajectory of the agent to each of a plurality of anchor trajectories, e.g., a respective probability for each of the future trajectories that represents the likelihood that the agent will adopt the trajectory. Each anchor trajectory characterizes a different possible future trajectory of the agent after the current time point and includes data specifying a sequence of multiple waypoint spatial locations in the environment that each correspond to a possible position of the agent at a respective future time point that is after the future time point. In other words, each anchor trajectory identifies a different sequence of waypoint locations in the environment that may be traversed by the surrounding agent after the current time point.

In some of these examples, the trajectory prediction output 152 for the given agent also includes, for each anchor trajectory, data defining, for each waypoint spatial location of the anchor trajectory, a probability distribution dependent on the waypoint spatial location. The probability distribution for a given waypoint spatial location defines respective likelihoods that the agent will occupy respective spatial positions in a vicinity of the waypoint spatial location at the future time point corresponding to the waypoint spatial location. That is, given that the agent follows the anchor trajectory, the probability distribution represents the space of predicted possible deviations from the anchor trajectory of the agent's actual future trajectory. In other words, for a given anchor trajectory, the probability distribution at a given future time point represents the space of possible deviations of the agent from the waypoint spatial location in the given anchor trajectory, with locations assigned higher probabilities being more likely deviations than locations assigned lower probabilities.

Generally, to generate the trajectory prediction outputs 152, the trajectory prediction system 150 generates a vectorized representation of the scene data. As will be described in more detail below, the vectorized representation of the scene data approximates geographic entities and agent trajectories characterized in the scene data using polylines and attributes of the polylines. The system 150 uses the vectorized representation of the scene data to generate respective polyline features for each of the surrounding agents. The system 150 then uses the polyline features to generate a respective predicted trajectory for each of one or more of the surrounding agents.

Generating the trajectory prediction outputs 152 will be described in more detail below with reference to FIGS. 2-4.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction system 150, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores all the training data used to train the trajectory prediction system i.e., to determine the trained parameter values 195 of the trajectory prediction system 150. The training data store 170 receives raw training examples from agents operating in the real world. For example, the training data store 170 can receive a raw training example 155 from the vehicle 102 and one or more other agents that are in communication with the training system 120. The raw training example 155 can be processed by the training system 120 to generate a new training example. The raw training example 155 can include scene data, i.e., like the scene data 142, that can be used as input for a new training example. The raw training example 155 can also include outcome data characterizing the state of the environment surrounding the vehicle 102 at the one or more future time points. This outcome data can be used to generate ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

Training the trajectory prediction system 150 is described in more detail below with reference to FIG. 3.

Figure 2:
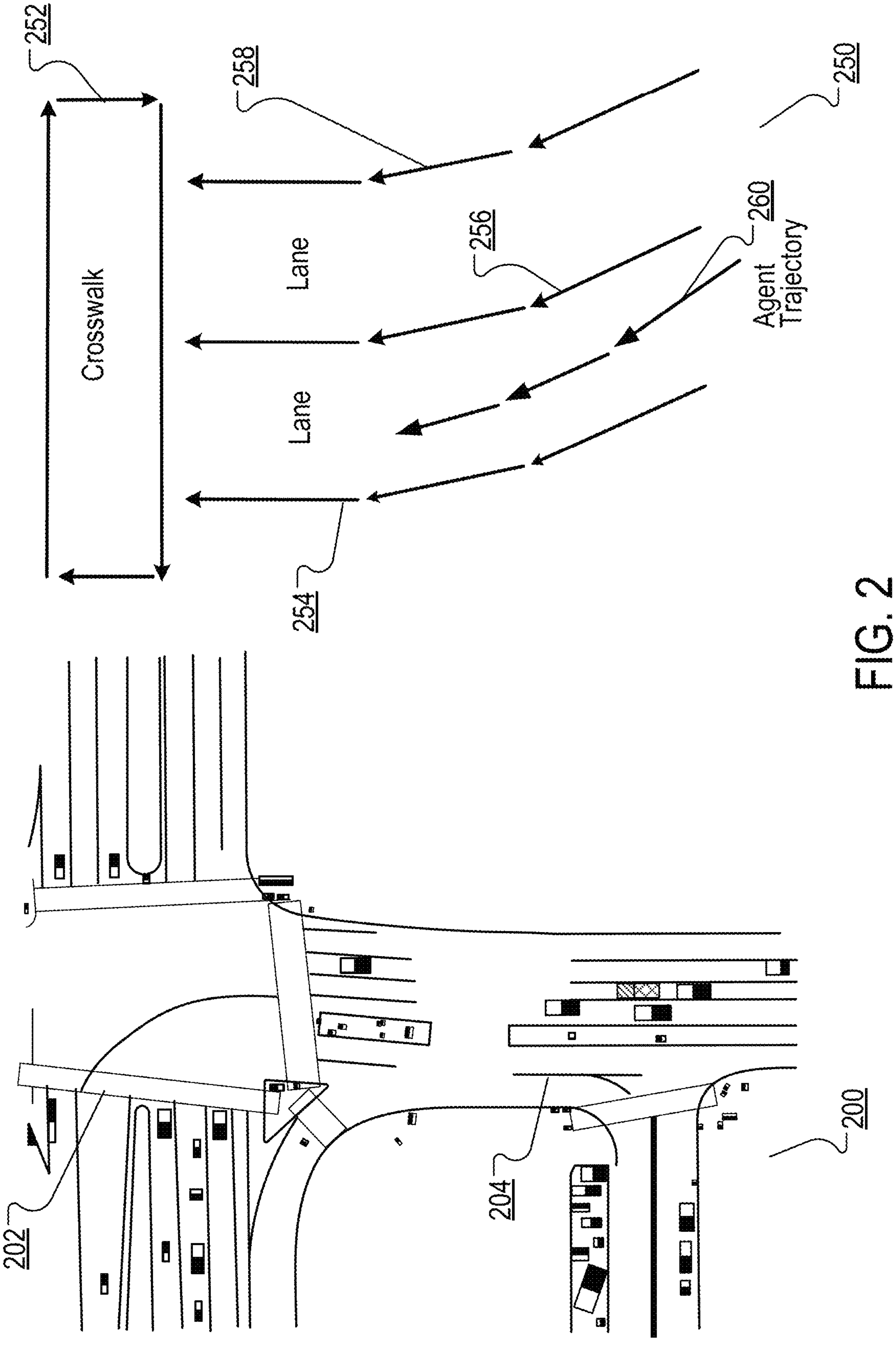
FIG. 2 is an illustration that compares a rasterized representation of a scene in an environment to a vectorized representation of the scene in the environment.

FIG. 2 is an illustration that shows a rasterized representation 200 of one scene in an environment and a vectorized representation 250 of another scene in the environment.

The rasterized representation 200 is an example of a representation of scene data that is used by some existing trajectory prediction systems to generate trajectory predictions. In particular, some existing trajectory prediction systems generate, from the scene data, a rasterized representation and provide the rasterized representation as input to a neural network, e.g., a convolutional neural network, that processes the rasterized representation to generate as output one or more trajectory predictions.

In particular, to generate the rasterized representation 200 from scene data, a system renders a map, e.g., a high-resolution (HD) map, of the scene as a rasterized image and color-codes different attributes of the scene in the rendered image. For example, while the example of FIG. 2 is depicted in black and white, it can be understood that the rasterized representation 200 may use one color to represent a crosswalk 202, another color to represent a driving lane 204, and two different colors to represent the heading of agents, e.g., vehicles, in the scene.

However, this approach can be problematic for several reasons.

First, color-coding attributes requires manual feature specification, i.e., of which attributes should be coded in the map and what colors to assign to each of the coded features, which may not be optimal for learning to predict trajectories.

Moreover, processing these rendered images generally requires a convolutional neural network to encode the image and then a trajectory decoder neural network to generate trajectory predictions from the encoded image. Convolutional neural networks have limited receptive fields, limiting the amount of context that can be considered when encoding the features that will be used to predict the trajectory for a given agent. Increasing the receptive field of a convolutional neural network, however, requires a much more computationally intensive, e.g., in terms of FLOPs and memory footprint, neural network, which may not be feasible to deploy on-board a vehicle and which may not be able to generate predictions within the latency requirements that are necessary for autonomous driving.

The trajectory prediction system described in this specification, however, instead generates vectorized representations of the scene data, e.g., the example vectorized representation 250, and then uses the vectorized representations to generate trajectory predictions. Making use of these vectorized representations allows the system to make accurate trajectory predictions using a neural network that has many fewer parameters and that requires at least an order of magnitude fewer FLOPs than would be required by a comparably performing neural network that makes use of rasterized representations like the representation 200.

More specifically, the scene data that is received as input by the trajectory prediction system characterizes multiple geographic entities, i.e., road features. The geographic extent of any given road feature can be represented as a point, a polygon, or a curve in geographic coordinates. For example, a lane boundary contains multiple control points that build a spline; a crosswalk is a polygon defined by several points; a stop sign is represented by a single point. All of these geographic entities can be closely approximated as polylines defined by one or more control points, along with their attributes.

Similarly, the dynamics of moving agents can also be approximated by polylines that represent the observed trajectories of the surrounding agents.

All of these polylines can then be represented as sets of vectors in the vectorized representation 250.

Thus, in the vectorized representation 250, trajectories, map features, and, optionally, other scene information are each represented as polylines, i.e., as a sequence of vectors.

In particular, the vectorized representation 250 shows a polyline 252 representing a crosswalk as a sequence of four vectors, lane boundary polylines 254, 256, and 258 representing boundaries defining two lanes as three sequences of three vectors, and a trajectory polyline 260 that represents the observed trajectory of an agent as a sequence of three vectors.

The vectors defining the polylines in the vectorized representation 250 can then be processed by an encoder neural network to generate respective polyline features of each of the polylines. The system can then generate a trajectory prediction for a given one of the agents in the environment by processing the polyline features of the polyline that represents the trajectory of the agent using a trajectory decoder neural network.

Generating a polyline for a given map feature or for an observed trajectory and generating trajectory predictions from polylines are described in more detail below with reference to FIGS. 3 and 4.

Figure 3:
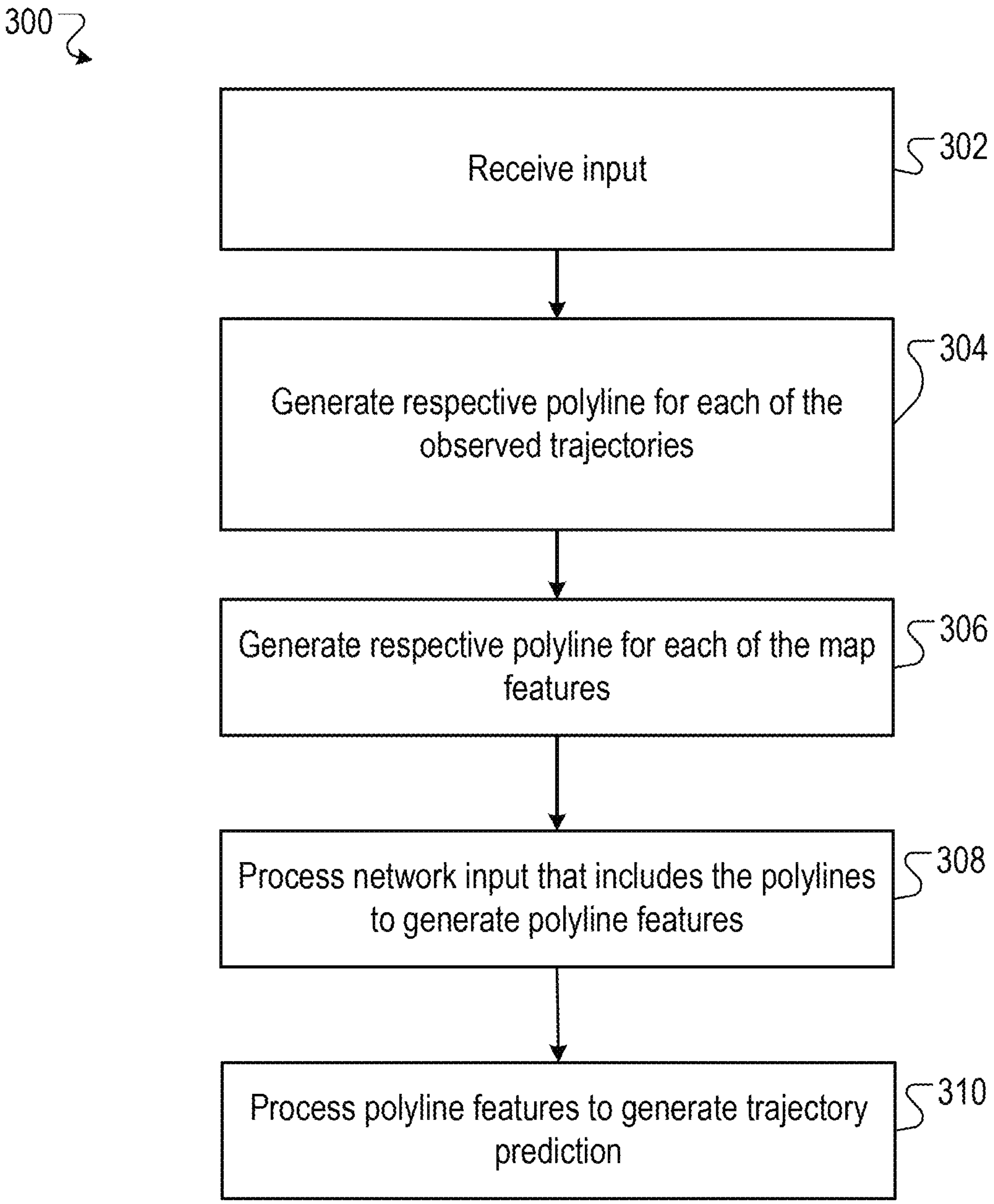
FIG. 3 is a flow diagram of an example process for generating a trajectory prediction output.

FIG. 3 is a flow diagram of an example process 300 for generating a trajectory prediction output for an agent in the vicinity of the vehicle. For convenience, the process 300 will be described as being performed by a system of one or more computers located in one or more locations. For example, a trajectory prediction system, e.g., the trajectory prediction system 150 of FIG. 1, appropriately programmed in accordance with this specification, can perform the process 300.

At any given time point, the system can perform the process 300 to generate a respective trajectory prediction for each of one or more agents in the vicinity of the vehicle. For example, the system can perform the process 300 to generate a trajectory prediction for each agent that has been identified as being in the vicinity of the vehicle by the sensor subsystem or for a proper subset of the identified agents, e.g., only for those agents for which trajectory predictions are required by the planning system of the vehicle.

The system receives an input that includes (i) data characterizing observed trajectories for each of one or more agents in an environment and (ii) map features of a map of the environment (step 302).

The system generates a respective polyline of each of the observed trajectories that represents the observed trajectory as a sequence of one or more vectors (step 304).

In particular, to generate the polyline for a given observed trajectory, the system generates a respective vector for each of one or more time intervals during the observed trajectory. For example, the system can divide the time interval spanned by the observed trajectory into time intervals of a fixed size and generate a respective vector for each of the fixed size time intervals.

The respective vector for each of the time intervals generally includes coordinates, e.g., two-dimensional coordinates or three-dimensional coordinates in some coordinate system, of the position of the agent along the trajectory at a beginning of the time interval and coordinates of the position of the agent along the trajectory at an end of the time interval.

The respective vector can also include features of the agent or of the trajectory. For example, the vector for a given time interval can include a timestamp identifying the time interval. As another example, the vector for a given time interval can include an identifier for the object type, e.g., vehicle, pedestrian, cyclist, and so on, of the corresponding agent.

The respective vector generally also includes a label, i.e., an integer identifier, of the polyline (and, accordingly, the agent) to which the vector belongs.

The system generates a respective polyline of each of the features of the map that represents the feature as a sequence of one or more vectors (step 306).

In particular, to generate the polyline for a given map feature, the system generates one or more vectors that connect a plurality of keypoints along the feature in the map. For example, the system can select a starting point and direction along the map feature and then uniformly sample key points from the splines at the same spatial distance. The system can then sequentially connect the neighboring key points into vectors.

The respective vector for each of the map features generally includes coordinates of a position of a start of the vector in the environment, i.e., in the map, and coordinates of a position of an end of the vector in the environment.

The respective vector can also include attribute features of the map feature. For example, the vector can include an identifier of the road feature type, e.g., crosswalk, stop light, lane boundary, and so on. As another example, the vector can include, for lane boundaries, the speed limit at the corresponding section of the lane. As yet another example, the vector can include, for stoplights, the current state, e.g., green, yellow, or red, of the stoplight at the most recent time point.

The respective vector generally also includes a label, i.e., an integer identifier, of the polyline (and, accordingly, the map feature) to which the vector belongs.

In some implementations, the system generates trajectory predictions for one target agent at a time. In these implementations, the coordinates in the respective vectors that are generated by the system are in a coordinate system that is relative to the position of the single target agent for which the prediction is being generated, e.g., the system can normalize the coordinates of all vectors to be centered around the location of the target agent at the most recent item step at which the location of the target agent was observed.

In some other implementations, the system generates trajectory predictions for multiple target agents in parallel. In these implementations, the coordinates in the respective vectors are in a coordinate system that is shared between the multiple target agents, e.g., centered at the center of a region that includes the positions all of the multiple target agents at the current time step.

The system processes a network input that includes the (i) respective polylines of the observed trajectories and (ii) the respective polylines of each of the features of the map using an encoder neural network to generate polyline features for each of the one or more agents (step 308).

Processing the network input using the encoder neural network to generate polyline features for each of the one or more agents is described in more detail below with reference to FIG. 4.

For one or more of the agents, the system generates a predicted trajectory for the agent from the polyline features for the agent (step 310). This will also be described in more detail below with reference to FIG. 4.

Figure 4:
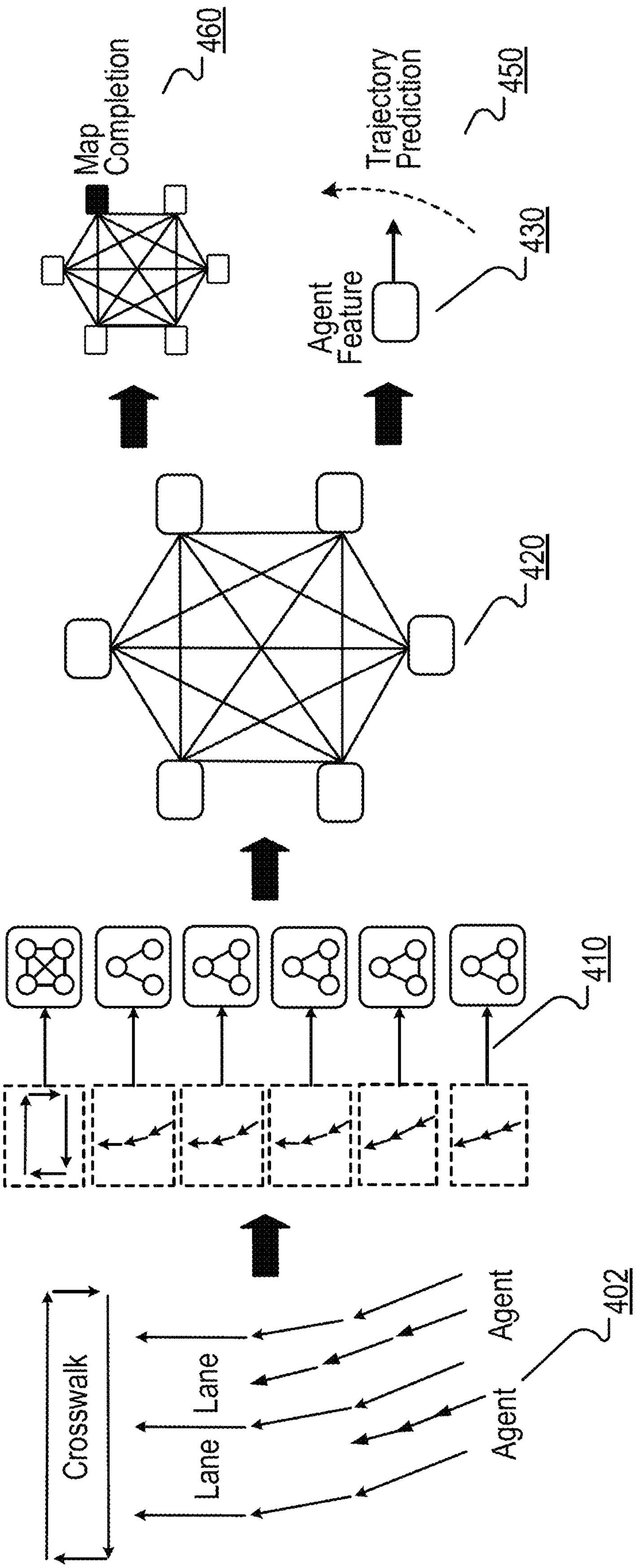
FIG. 4 illustrates the operation of the trajectory prediction system during inference and during training.

FIG. 4 illustrates the operation of the trajectory prediction system during inference, i.e., on-board the vehicle, and during training.

In particular, as shown in FIG. 4, the trajectory prediction system includes an encoder neural network that, in turn, includes a graph neural network 410 and a self-attention neural network 420. The system also includes a trajectory decoder neural network 430.

The example of FIG. 4 shows how, when on-board the vehicle or during training, the trajectory prediction system generates a trajectory prediction 450 for one of the agents represented in a vectorized representation 402 of a scene in the environment. The vectorized representation 402 includes sequence of vectors representing six polylines: a crosswalk polyline, three lane boundary polylines that collectively define two driving lanes, and two agent trajectory polylines. Other types of map features may also be represented by polylines when representing other scenes, e.g., road signs, stoplights, sidewalks. Similarly, other scenes may include other agents that do not travel within the lane boundaries, e.g., pedestrians or cyclists.

In particular, to generate the prediction 450, the system processes, for each polyline in the vectorized representation 402, the vectors in the polyline using the graph neural network 410 to generate initial polyline features of the polyline.

The graph neural network 220 is a local graph neural network, i.e., a neural network that operates on each of the polylines independently and that represents each vector in any given polyline as a node in a graph that represents the given polyline. Thus, as shown in FIG. 4, the graph neural network 220 performs six sets of local operations, where each set of local operations is performed on a corresponding one of six graphs, each of the six graphs representing different one of the six polylines in the representation 402.

In particular, the graph neural network 220 includes a sequence of one or more subgraph propagation layers that, when operating on a given polyline, each receive as input a respective input feature for each of the nodes in the graph representing the given polyline, i.e., each of the vectors in the given polyline, and generate as output a respective output feature for each of the nodes in the graph, i.e., for each of the vectors in the given polyline.

The input features to the first subgraph propagation layer in the sequence are the vectors in the given polyline and the graph neural network 220 generates the initial polyline features of the given polyline from the output features of the last subgraph propagation layer in the sequence. For example, the graph neural network 220 can apply a pooling operation, e.g., max pooling or average pooling, over the output features of the last subgraph propagation layer for each of the nodes to generate the initial polyline features. Optionally, the system can normalize, e.g., L2 normalize, the outputs of the pooling operation to generate the initial polyline features.

To generate the output features for the nodes in the given polyline, each subgraph propagation layer applies an encoder function to each of the input features to the layer to generate a respective transformed feature for each of the nodes. The encoder function is generally a learned function, e.g., a multi-layer perceptron (MLP), with different weights for different layers.

The graph neural network 220 then applies an aggregation function, i.e., a permutation invariant aggregation function, to the transformed features for each of the nodes to generate an aggregated feature. For example, the aggregation function can be a pooling operation, e.g., max pooling or average pooling.

For each node, the layer then applies a relational operator to (i) the transformed feature for the node and (ii) the aggregation function to generate the output feature for the node. The relational operator can be, e.g., a concatenation operation that concatenates the feature vectors.

Thus, the operations of the l-th layer of the graph neural network can be expressed as:

$$v_i^{l+1} = \varphi_{rel}\left(\varphi_{enc}\left(v_i^l\right), \varphi_{agg}\left(\left\{\phi_{enc}\left(v_j^l\right)\right\}\right)\right),$$

where $$v_i^{l+1}$$

is the output feature for node i generated by the l-th layer, $$v_i^l$$

is the input feature for node i for the l-th layer, $\varphi_{rel}$ is the relational operator, $\varphi_{enc}$ is the transformation function, and $\varphi_{agg}$ is the aggregation function.

Thus, the output of the graph neural network 410 is respective initial polyline features for each of the polylines.

The system then processes the initial polyline features for each of the polylines using the self-attention neural network 420 to generate the polyline features for each of the one or more agents. Generally, the self-attention neural network 420 refines the initial polyline features based on interactions between different components of the scene in the environment to generate the polyline features. That is, unlike the graph neural network 410 that operates on each polyline independently, the self-attention neural network 420 updates initial polyline features for each polyline based on the initial polyline features for other polylines.

In particular, the self-attention neural network 420 includes one or more self-attention layers. Each self-attention layer receives as input a respective input feature for each of the polylines and applies a self-attention mechanism to the input features to generate a respective output feature for each of the polylines.

The input features to the first self-attention layer are the initial polyline features for the polylines and the output features of the last self-attention layer are the polyline features for the polylines.

To generate output features from input features, each self-attention layer generates, from the input features, a respective query for each polyline by applying a first, learned linear transformation to the input feature for the polyline, a respective key for each polyline by applying a second, learned linear transformation to the input feature for the polyline, and a respective value for each polyline by applying a third, learned linear transformation to the input feature for the polyline. For each particular polyline, the system then generates an output of a self-attention mechanism for the particular polyline as a linear combination of the values for the polylines, with the weights in the linear combination being determined based on a similarity between the query for the particular polyline and the keys for the polylines. In particular, in some implementations, the operations for the self-attention mechanism for a given self-attention layer can be expressed as follows:

$$\text{self-attention}(P) = \text{softmax}\left(P_Q P_K^T\right) P_V,$$

where P is a matrix of the input features, $P_Q$ is a matrix of the queries, $P_K$ is a matrix of the keys, and $P_V$ is a matrix of the values.

In some cases, the output of the self-attention mechanism is the output features of the self-attention layer. In some other cases, the self-attention layer can perform additional operations on the output of the self-attention mechanism to generate the output features for the layer, e.g., one or more of: residual connections, feed-forward layer operations, or layer normalization operations.

When the self-attention neural network includes only one self-attention layer, the system can perform only a portion of the computation of the self-attention layer at inference time because only the polyline features for the polylines representing one or more of the agents need to be computed. Thus, the system can perform only the operations for the queries corresponding to the polyline features for the agents for which trajectory predictions need to be generated.

To generate the trajectory prediction 450 for a given agent, the system then processes the polyline features for the given agent using the trajectory decoder neural network 430 to generate the trajectory prediction 450 for the given agent.

In the example of FIG. 4, the trajectory prediction for the agent is a regressed predicted trajectory that includes predicted locations of the agent (and, optionally, other information) for the agent at multiple future time steps after the current time step. The other information can include, e.g., the heading of the agent. In this example, the trajectory decoder neural network 430 can be, e.g., an MLP that generates the entire future trajectory in one forward pass or a recurrent neural network (RNN) that generates the future trajectory auto-regressively.

In other implementations, i.e., different from those shown in FIG. 4, the trajectory decoder 430 can generate an output that defines a probability distribution over possible future trajectories for the given agent. An example of such a trajectory decoder is described in MultiPath: Multiple Probabilistic Anchor Trajectory Hypotheses for Behavior Prediction, arxiv: 1910.05449.

When the operations of FIG. 4 are being performed during the training of the trajectory prediction system, i.e., during the training of the encoder neural network and the trajectory decoder neural network, the system can obtain a ground truth trajectory for each of the one or more agents after the current time step. The system can compute a loss, e.g., a negative Gaussian log likelihood loss or other negative log likelihood based loss, that measures errors in the predicted trajectories for the one or more agents relative to the ground truth future trajectories for the one or more agents and use the loss to determine an update to the parameters of the encoder neural network and the trajectory decoder neural network, e.g., through stochastic gradient descent with backpropagation. By repeatedly updating the parameters of the encoder and the trajectory decoder on different training examples, the system can train the trajectory prediction system to make accurate trajectory predictions.

In some implementations, during training, the system also performs an auxiliary map completion task 460 to improve the training of the neural networks.

In other words, at training time, the system masks out the initial polyline features for a randomly selected subset of at least some of the polylines, e.g., either a randomly selected subset of all of the polylines or a randomly selected subset of only the polylines corresponding to road features.

For each particular polyline in the subset, the system then predicts the initial polyline feature for the particular polyline given (i) the masked polyline features for the polylines in the randomly selected subset and (ii) the initial polyline features for the other polylines that are not in the subset.

In particular, in these implementations, during training the system appends each initial polyline feature with an identifier for the corresponding polyline. The identifier for the corresponding polyline can be generated from the vectors that represent the polyline. As a particular example, the identifier for the polyline can be the smallest, i.e., closest to the origin, set of starting coordinates of any of the starting coordinates of any of the vectors in the polyline.

The system then masks, i.e., sets to zeros or some other predetermined value, the initial polyline features for the polylines in the subset. Thus, the initial polyline feature for each polyline in the subset becomes a masked out vector appended with an identifier for the corresponding polyline. The system then processes the initial polyline features for the polylines as described above to generate a respective polyline feature for each polyline. For each particular polyline in the subset, the system then processes the polyline feature for the polyline using a node feature decoder neural network, e.g., an MLP, to generate a predicted initial polyline feature for the polyline. The system can then compute a loss between the initial polyline feature for the polyline (that was masked out) and the predicted initial polyline feature for the polyline. For example, the loss can be a Huber loss or any other loss that measures the difference between two vectors.

The system can then use an overall loss that is a combination, e.g., a sum or the weighted sum of the map completion task loss and the trajectory prediction task loss to train the node feature decoder neural network, the trajectory prediction decoder neural network, and the encoder neural network. After training, because the system no longer needs to perform the map completion task, the node feature decoder neural network is not included as part of the system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:

receiving an input including (i) data characterizing observed trajectories for each of one or more agents in an environment and (ii) map features of a map of the environment;

generating a respective polyline of each of the observed trajectories that represents the observed trajectory as a sequence of one or more vectors;

generating a respective polyline for each of the map features that represents the map feature as a sequence of one or more vectors, the generating comprising generating vectors connecting a plurality of keypoints along the feature in the map, wherein each of the vectors comprises one or more attributes of the feature in the map;

processing a network input comprising the (i) respective polylines of the observed trajectories and (ii) the respective polylines of each of the features of the map using a neural network system to generate a prediction characterizing the environment; and controlling a movement of a vehicle based on the prediction.

2. The method of claim 1, wherein processing the network input comprises:

for each polyline, processing the vectors in the polyline using a graph neural network to generate initial polyline features of the polyline; and processing the initial polyline features for each of the polylines using a self-attention neural network to generate respective polyline features for each of the one or more agents.

3. The method of claim 1, wherein processing a network input to generate the prediction comprises:

processing the network input using an encoder to generate polyline features for each of the one or more agents; and for one or more of the agents, processing the polyline features for the agent using a trajectory decoder neural network to generate a predicted trajectory of the agent.

4. The method of claim 1, wherein generating a respective polyline of each of the observed trajectories that represents the observed trajectory as a sequence of one or more vectors comprises:

generating a respective vector for each of one or more time intervals during the observed trajectory.

5. The method of claim 4, wherein the respective vector for each of the one or more time intervals comprises:

coordinates of a position of the agent along the trajectory at a beginning of the time interval; and coordinates of a position of the agent along the trajectory at an end of the time interval.

6. The method of claim 4, wherein the respective vector for each of the one or more time intervals comprises:

a timestamp identifying the time interval.

7. The method of claim 4, wherein the respective vector for each of the one or more time intervals comprises:

a label identifying the polyline to which the vector belongs.

8. The method of claim 1, wherein each of the vectors connecting a plurality of keypoints along the feature in the map comprises:

coordinates of a position of a start of the vector in the environment; and coordinates of a position of an end of the vector in the environment.

9. The method of claim 1, wherein each of the vectors connecting a plurality of keypoints along the feature in the map comprises:

one or more attribute features of the map feature.

10. The method of claim 1, wherein each of the vectors connecting a plurality of keypoints along the feature in the map comprises:

a label identifying the polyline to which the vector belongs.

11. A system comprising one or more computers and one or more storage devices storing instructions, when executed by the one or more computers, cause the one or more computers to perform operations comprising:

receiving an input including (i) data characterizing observed trajectories for each of one or more agents in an environment and (ii) map features of a map of the environment;

generating a respective polyline of each of the observed trajectories that represents the observed trajectory as a sequence of one or more vectors;

generating a respective polyline of each of the features of the map that represents the feature as a sequence of one or more vectors, the generating comprising generating vectors connecting a plurality of keypoints along the feature in the map, wherein each of the vectors comprises one or more attributes of the feature in the map;

processing a network input comprising the (i) respective polylines of the observed trajectories and (ii) the respective polylines of each of the features of the map using a neural network system to generate a prediction characterizing the environment; and controlling a movement of a vehicle based on the prediction.

12. The system of claim 11, wherein processing the network input comprises:

for each polyline, processing the vectors in the polyline using a graph neural network to generate initial polyline features of the polyline; and processing the initial polyline features for each of the polylines using a self-attention neural network to generate the respective polyline features for each of the one or more agents.

13. The system of claim 11, wherein processing a network input to generate the prediction comprises:

processing the network input using an encoder to generate polyline features for each of the one or more agents; and for one or more of the agents, processing the polyline features for the agent using a trajectory decoder neural network to generate a predicted trajectory of the agent.

14. The system of claim 11, wherein generating a respective polyline of each of the observed trajectories that represents the observed trajectory as a sequence of one or more vectors comprises:

generating a respective vector for each of one or more time intervals during the observed trajectory.

15. The system of claim 14, wherein the respective vector for each of the one or more time intervals comprises:

coordinates of a position of the agent along the trajectory at a beginning of the time interval; and coordinates of a position of the agent along the trajectory at an end of the time interval.

16. The system of claim 14, wherein the respective vector for each of the one or more time intervals comprises:

a timestamp identifying the time interval.

17. The system of claim 14, wherein the respective vector for each of the one or more time intervals comprises:

a label identifying the polyline to which the vector belongs.

18. One or more non-transitory computer-readable storage media storing instructions that, when executed by one or more computers, cause the one or more computers to perform operations comprising:

receiving an input including (i) data characterizing observed trajectories for each of one or more agents in an environment and (ii) map features of a map of the environment;

generating a respective polyline of each of the observed trajectories that represents the observed trajectory as a sequence of one or more vectors;

generating a respective polyline of each of the features of the map that represents the feature as a sequence of one or more vectors, the generating comprising generating vectors connecting a plurality of keypoints along the feature in the map, wherein each of the vectors comprises one or more attributes of the feature in the map;

processing a network input comprising the (i) respective polylines of the observed trajectories and (ii) the respective polylines of each of the features of the map using a neural network system to generate a prediction characterizing the environment; and controlling a movement of a vehicle based on the prediction.

* * * * *